United States Patent [19]

Iri et al.

[11] Patent Number: 4,850,664
[45] Date of Patent: Jul. 25, 1989

[54] CONNECTOR FOR OPTICAL FIBER

[75] Inventors: Eiji Iri, Kawanishi; Masatoshi Tabira, Amagasaki, both of Japan

[73] Assignees: Dainichi-Nippon Cables, Ltd., Hyogo; Meiko Electronics Co., Ltd., Kanagawa; Nichiei Yauhin Kogyo Co., Ltd., Tokyo, all of Japan

[21] Appl. No.: 871,777

[22] Filed: Jun. 9, 1986

[30] Foreign Application Priority Data

Jun. 18, 1985 [JP]  Japan ................................ 60-133564
Aug. 6, 1985 [JP]  Japan ........................... 60-121411[U]
Aug. 23, 1985 [JP]  Japan ........................... 60-129272[U]

[51] Int. Cl.⁴ ............................................. G02B 6/36
[52] U.S. Cl. ................................... 350/96.2; 350/96.21
[58] Field of Search ................. 350/96.20, 96.21, 96.22

[56] References Cited

U.S. PATENT DOCUMENTS 4,182,017  1/1980  Ford et al. ...................... 350/96.2 X
4,261,774  4/1981  Lewis et al. .................... 350/96.2 X
4,681,398  7/1987  Bailey et al. ...................... 350/96.20
4,702,556  10/1987  Ishii et al. ...................... 350/96.2 X
4,770,487  9/1988  Williams ............................ 350/96.2

FOREIGN PATENT DOCUMENTS 0029512  1/1981  European Pat. Off. ......... 350/96.21

*Primary Examiner*—John D. Lee
*Assistant Examiner*—John Ngo
*Attorney, Agent, or Firm*—Burns, Doane, Swecker & Mathis

[57] ABSTRACT

The present invention relates to a connector for optical fiber used as optical communication parts, in particular to a ferrule which is one member of a plug side of the connector, a pointed end portion of the ferrule being partially cut off, and the optical fiber being inserted and fixed into the ferrule, the terminal treatment of the optical fiber is practiced by injuring the circumferential surface of the pointed end portion of the optical fiber and by cleaving the pointed end portion of the optical fiber.

14 Claims, 9 Drawing Sheets

CONNECTOR FOR OPTICAL FIBER

BACKGROUND OF THE INVENTION

1. Field of the Invention

The present invention relates to a connector for optical fiber in an optical communication equipment such as an optical data link, in particular to an improvement of a ferrule which is one member of a plug side of the connector.

2. Description of the Prior Art

FIG. 1 is a schematic structural view of a connector for optical fiber, in which reference numeral 10 designates a plug and 13 designates a module provided with a receptacle 14. The module 13 comprises the receptacle 14, elements 15, 16 arranged within said receptacle 14 and an electronic circuit connected with these components. Optical fiber cords 1, 1 are connected either separately or in a bundle to other apparatus and connected to the plug 10 at the ends thereof. That is to say, a pointed end portion of each optical fiber cord 1 is bared of its cover and fitted into each metallic cylindrical ferrule 4 serving to protect the rest of the bared portion of the cord 1. The base ends of the optical fiber cords 1, 1 or ferrules 4, 4 are held in a housing 11 of the plug 10. The housing 11 is provided with cylindrical projections 11a, 11a at pointed end portion thereof, the ferrules 4, 4 somewhat projecting from the projections 11a, 11a.

The projections 11a, 11a are inserted into a housing 17 of the receptacle 14, an opto-electrical transfer element 15 and an electro-optical transfer element 16 within the module 13 facing to the optical fibers 1a, 1a inserted into the ferrules 4, 4. The module 13 contains said elements 15, 16, which are connected in parallel with each other, therein, these elements 15, 16 being connected to a receiving side circuit and a transmitting side circuit (not shown), respectively.

FIG. 2 is a half sectional view showing the construction of the conventional ferrule 4. The ferrule 4 has a smaller outside diameter within the projection 11a of the housing 11 and a portion of the pointed end side all along from said projection 11a. Washers 12, 12 to be a spring seat of a coiled spring 22 are mounted on a larger diameter portion in the housing 11 fixedly at a pointed end side thereof and slidably at a base end side thereof. The coiled spring 22 is interposed between both washers so as to apply a pressing force to the ferrule 4 when the projection 11a of the plug 10 is inserted into the housing 17 of the receptacle 14, whereby suitably maintaining a positional relation between the ferrule 4 and the module 13. The bared portion of the optical fiber cord 1 is further bared of its jacket 1b to expose the optical fiber 1a, the exposed optical fiber 1a being inserted into the ferrule 4 as far as a pointed end of the ferrule 4.

The optical fiber 1a is inserted into an optical fiber-inserting-bore 4c of the ferrule 4, which is under the condition that its inside is filled with a resin 19, as shown in FIG. 2, in the terminal treatment thereof and its pointed end somewhat projects out of the ferrule 4. After the resin 19 is set, an end face of the optical fiber 1a is polished so that the ferrule 4 and the optical fiber 1a are on the same level.

However, the above described connector for optical fiber has a problem in that the setting and polishing of the resin 19 take a time in the terminal treatment of the optical fiber 1a, the workability being inferior due to the use of a resin, and the setting state of the resin 19 being unstable according to the environmental conditions such as temperature and humidity.

SUMMARY OF THE INVENTION

It is a first object of the present invention to provide a connector for optical fiber which needs not use adhesives and take a time for curing them.

It is a second object of the present invention to provide a connector for optical fiber which can simplify the terminal treatment of the optical fiber, whereby remarkably reducing the workhour.

It is a third object of the present invention to provide a connector for optical fiber which needs not polish, whereby requiring no skill in the terminal treatment of the optical fiber.

It is a fourth object of the present invention to provide a connector for optical fiber which can practice the terminal treatment of the optical fiber by injuring a pointed end portion of the optical fiber by means of an edged tool and bending the optical fiber.

It is a fifth object of the present invention to provide a connector for optical fiber which can practice the terminal treatment of the optical fiber by injuring a pointed end portion of the optical fiber by means of an edged tool and bending the optical fiber, and further can improve the protection of the pointed end portion of the optical fiber.

It is a sixth object of the present invention to provide a connector for optical fiber in which a pointed end face of a ferrule is colored in two tones to make the terminal treatment of the optical fiber easy.

It is a seventh object of the present invention to provide a connector for optical fiber in which an injury is marked on a part of a circumferential surface of a pointed end portion of a ferrule, whereby making the terminal treatment of the optical fiber easy.

It is an eighth object of the present invention to provide a connector for optical fiber whose ferrule is easy to produce.

The above and further objects and features of the invention will more fully be apparent from the following detailed description with accompanying drawings.

DETAILED DESCRIPTION OF THE INVENTION

Figure 1:
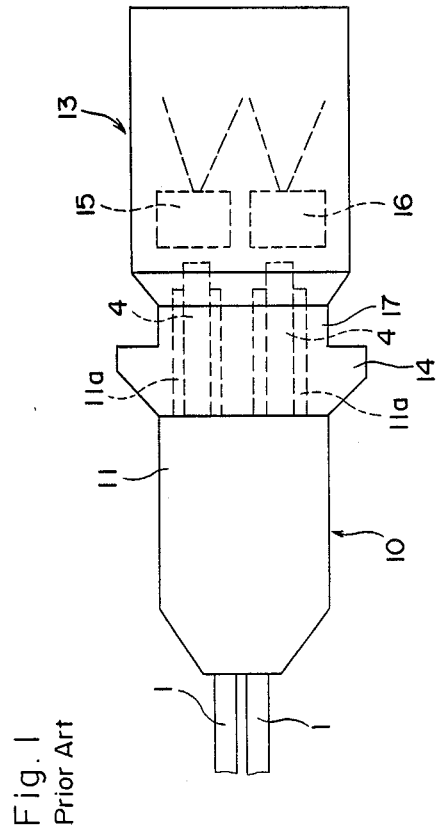
FIG. 1 is a schematic structural view showing a connector for optical fiber.
Figure 2:
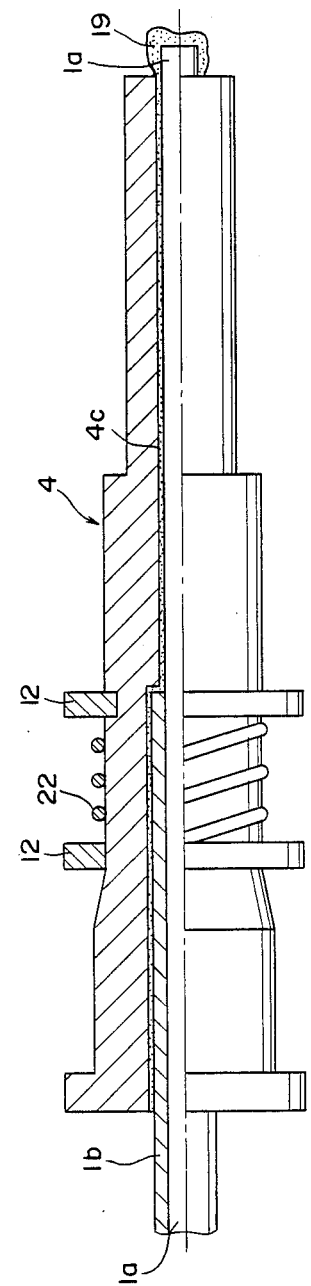
FIG. 2 is a half sectional view showing a terminal structure of a conventional connector for optical fiber.
Figure 3:
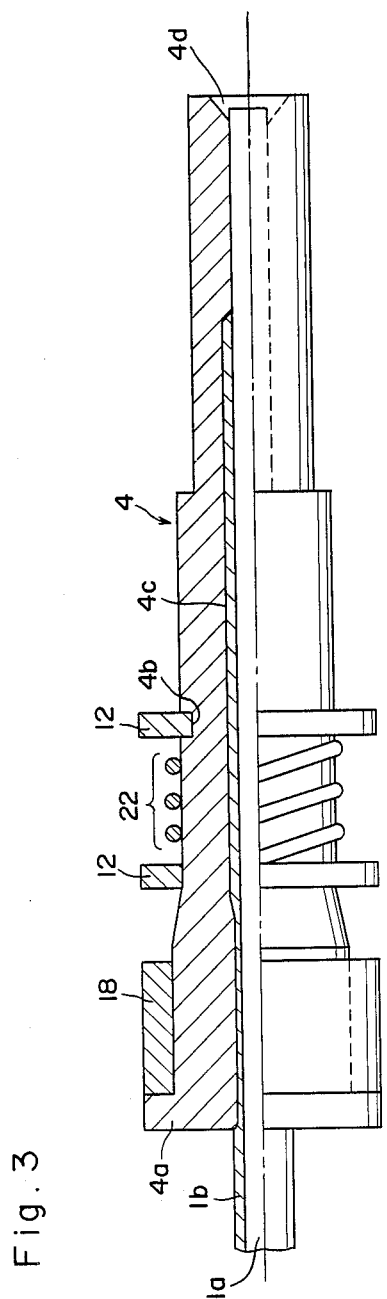
FIG. 3 is a half sectional view showing a terminal structure of a connector for optical fiber according to a first preferred embodiment of the present invention.
Figure 4:
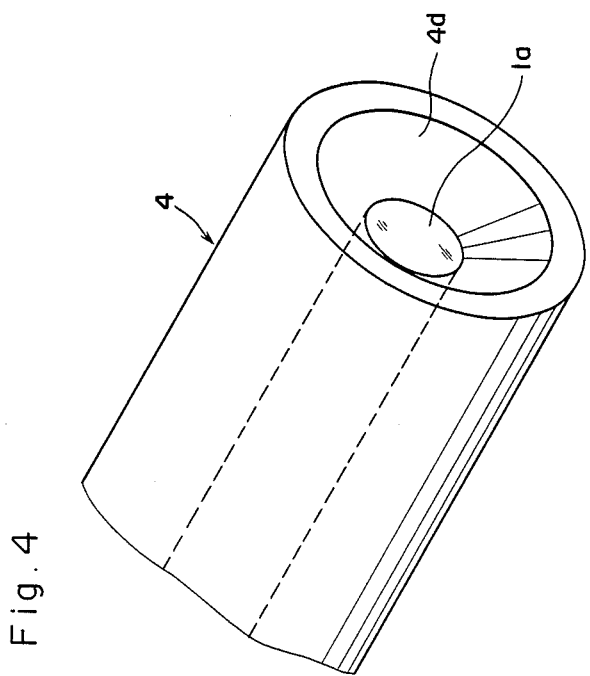
FIG. 4 is an enlarged perspective view showing a pointed end portion as shown in FIG. 3.
Figure 5:
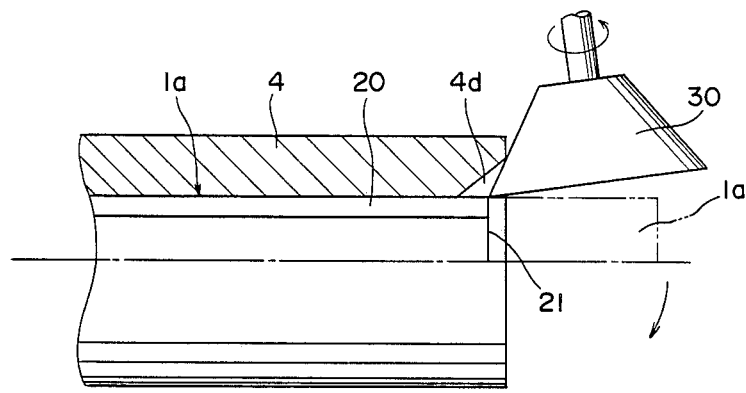
FIG. 5 is an enlarged half sectional view showing a pointed end portion as shown in FIG. 3.
Figure 6:
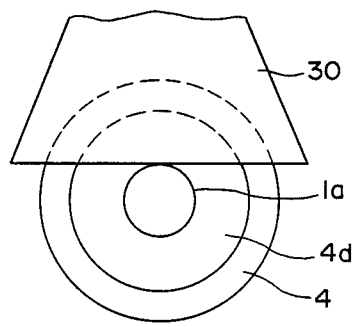
FIG. 6 is a front view showing a pointed end portion as shown in FIG. 5.
Figure 7:
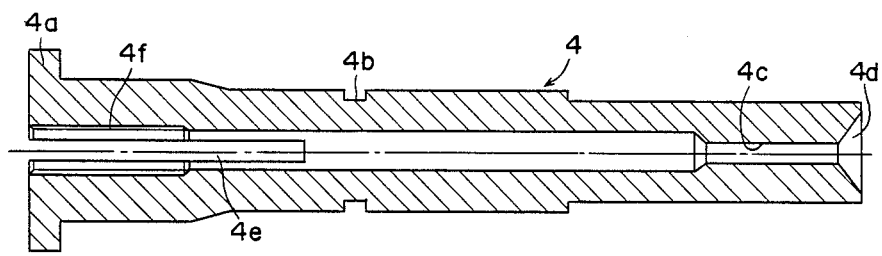
FIG. 7 is a diagram showing a body of a ferrule.
Figure 8:
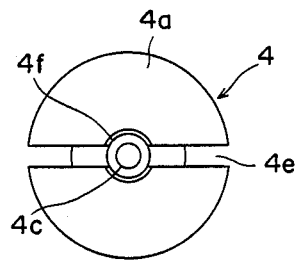
FIG. 8 is a front view showing a base end portion of a ferrule.

The present invention will be below described in detail with reference to the drawings showing the preferred embodiments thereof, in which FIG. 3 is a half sectional view showing a terminal structure of a plug side of a connector for optical fiber according to the present invention, FIG. 4 being an enlarged perspective view showing a pointed end portion of a connector for optical fiber as shown in FIG. 3, FIG. 5 being an enlarged half sectional view showing a pointed end portion of a connector for optical fiber as shown in FIG. 3, FIG. 6 being a front view showing a pointed end portion of a connector for optical fiber as shown in FIG. 5, FIG. 7 being a diagram showing a body of a ferrule according to the present invention, and FIG. 8 being a front view showing a base end portion of a ferrule as shown in FIG. 7.

A ferrule 4 made of nickel-plated brass (or phosphor-bronze) is provided with a flange 4a at a base end portion thereof. The joint portion of the base end portion and an intermediate portion of the ferrule 4 is tapered so that a diameter of the base end portion is slightly larger than that of the intermediate portion and the joint portion is provided with a stepped portion so that a diameter of a pointed end portion is slightly smaller than that of intermediate portion. The intermediate portion of the ferrule 4 is provided with a groove 4b formed on the entire or part of an outer periphery of a central portion thereof.

The ferrule 4 is provided with an axially extending central bore 4c which is reduced in diameter (to an extent of 1 mm long) at a pointed end side. In addition, the pointed end portion of the ferrule 4 is formed in the form of a bowl-like concaved part 4d (to an extent of 50 to 2,000 μm deep) having a larger diameter at a pointed end face side thereof.

An optical fiber cord 1 is bared of a sheath made of vinyl resin and a fiber member (not shown) and inserted into the ferrule 4 as far as the middle of the ferrule 4, a pointed end side of the optical fiber being bared of a jacket 1b in order that a bared optical fiber 1a is inserted into the ferrule 4. In the case where the optical fiber 1a is a fiber clad of polymeric materials, a clad layer 20 is in general exposed but in the case where the optical fiber 1a is a fiber clad with glassy materials (pure quartz or multi-component materials), it goes without saying that the clad layer 20 provided with a resin layer such as a precoat layer and a buffer layer formed thereon can be inserted into the ferrule 4 as far as a pointed end of the ferrule 4.

The ferrule 4 is provided with a pair of slittings 4e, 4e in the axial direction formed at positions, extending from the base end thereof to the intermediate portion a little closer to the base end, apart by 180°. In addition, the ferrule 4 is provided with a screw 4f formed on an internal circumferential surface of the base end portion thereof. A cylindrical member 18 is put on the base end portion of the ferrule 4 with pressing the base end surface thereof against the flange 4a of the base end portion of the ferrule 4. An inside diameter of said cylindrical member 18 is smaller than an outside diameter of the base end portion of the ferrule 4 but larger than an outside diameter of the intermediate portion of the ferrule 4. The base end portion provided with the slitting 4e of the ferrule 4 is reduced in diameter by putting the cylindrical member 18 on the ferrule 4 from its pointed end side to its base end portion to reduce the jacket 1b in diameter from the outside, whereby fixedly mounting the optical fiber 1a on the ferrule 4. In addition, reference numerals 12, 12 designate washers to be spring seats of a coiled spring 22, surrounding the ferrule 4. The washers 12, 12 are fixedly mounted on aforesaid groove 4b at a pointed end side thereof and slidable in the axial direction of the ferrule 4 at a base end side thereof.

The terminal treatment of the optical fiber 1a is practiced in the following manner by the use of the ferrule 4 provided with the above described concaved part 4d. At first, the optical fiber 1a covered partially with the jacket 1b in the same manner as the conventional connector for optical fiber is inserted into the ferrule 4 so as to slightly project a pointed end thereof out of the concaved part 4d as shown with a two-dot chain line in FIG. 5. Then, the cylindrical member 18 is put under pressure onto the ferrule 4 from the pointed end side of the ferrule 4 as far as it collides with the flange 4a so as to fix the optical fiber 1a in the ferrule 4. In this time, the screw 4f is caught in a surface (a clad layer 20) of the optical fiber 1a to strengthen the fixation of the optical fiber 1a. And, as shown in, for example, FIG. 5, a pointed end acute portion of a rotary truncated conical edged tool 30 having a larger diameter at a pointed end side thereof is brought into contact with the inside portion of the concaved part 4d of the surface (the clad layer 20) of the optical fiber 1a to slightly injure the latter (in the case of a polymer clad, even a core is injured). And, the pointed end of the optical fiber 1a is held between fingers or tweezers and bend toward a side opposite to the injured portion, as shown with an arrow in FIG. 5. Thus, the optical fiber 1a is cloven with the injury as a starting end to form a cloven surface 21 on a pointed end face of the remained optical fiber 1a.

Although, in the case where the optical fiber 1a is projected from the ferrule 4 or the concaved part 4d in the terminal treatment, as above described, the projecting length of 3 to 5 cm is suitable, the optical fiber 1a needs not always be projected. That is to say, the terminal of the optical fiber 1a can be positioned inside the concaved part 4d but it is necessary to select the projecting length of the optical fiber 1a so that the optical fiber 1a can be cloven. In addition, the position to be cloven or injured is preferably selected at one inside 20 to 100 μm from an end edge of the concaved part in view of the protection of the optical fiber 1a. Furthermore, the concaved part 4d is not always limited to bowl-like one, that is to say every one having an inside diameter larger than that of the base end side can be used.

Figure 9:
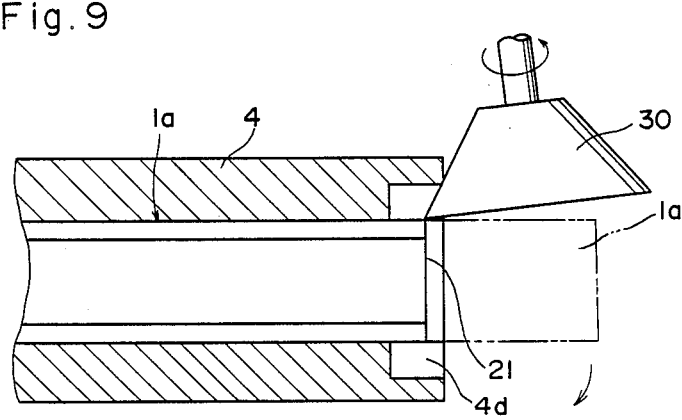
FIG. 9 is an enlarged sectional view showing a pointed end portion of a ferrule according to a second preferred embodiment of the present invention.

FIG. 9 shows a second preferred embodiment of the present invention. In this embodiment, the concaved part 4d has the equal diameter at the pointed end face side and the inside depth side thereof, in short the concaved part 4d is columnar. In addition, the inside depth of the columnar concaved part 4d can be tapered.

Figure 10:
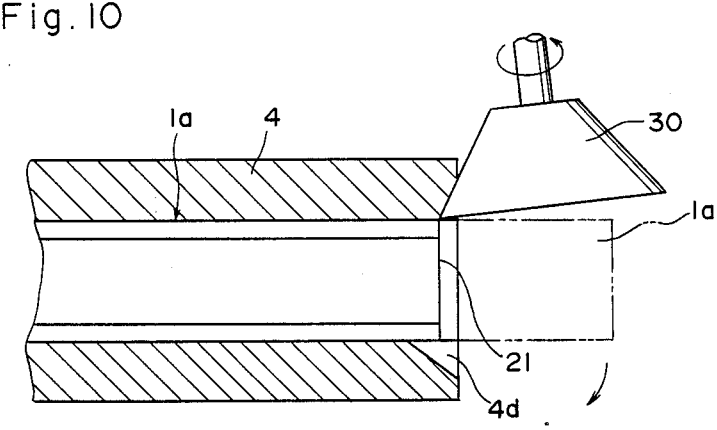
FIG. 10 is an enlarged sectional view showing a pointed end portion of a ferrule according to a third preferred embodiment of the present invention.

FIG. 10 shows a third preferred embodiment of the present invention. In this embodiment, the ferrule 4 is provided with the concaved part 4d having a length in the circumferential length direction larger than a diameter of the optical fiber 1a, formed only at a part of the pointed end opening in the circumferential direction thereof (the lower side in the drawing). The pointed end of the optical fiber 1a is coincided with the pointed end of the ferrule 4 or slightly projected over the ferrule 4. And, similarly to the above described embodiments, the ferrule 4 is diagonally cut open by means of a rotary edged tool 30 from the side (the upper side in the drawing) symmetric to the concaved part 4d from the pointed end face to the central side thereof to injure the surface of the optical fiber 1a. And then, the optical fiber 1a is bent toward the side of the concaved part 4d, as shown with an arrow. Since a gap of the concaved part 4d exists on the circumferential surface of the optical fiber 1a and the ferrule 4, the optical fiber 1a is easy to bend and cloven with the injury as a starting end.

Since the polishing is not required in the case where the above described terminal treatment is practiced, the adherence and fixation by the use of the resin 19 is not required. Thus, a time which has been required for the operation for about 20 minutes, can be shortened to only about 30 seconds. In addition, no skill is required differently from the conventional methods.

Besides, an optical loss on the cloven surface is about 0.5 dB, which is equal to that of the conventional polished surface, in the case of a polymer clad fiber having a core diameter of 250 μm and an outside diameter of the clad layer 20 of 450 μm.

Figure 11:
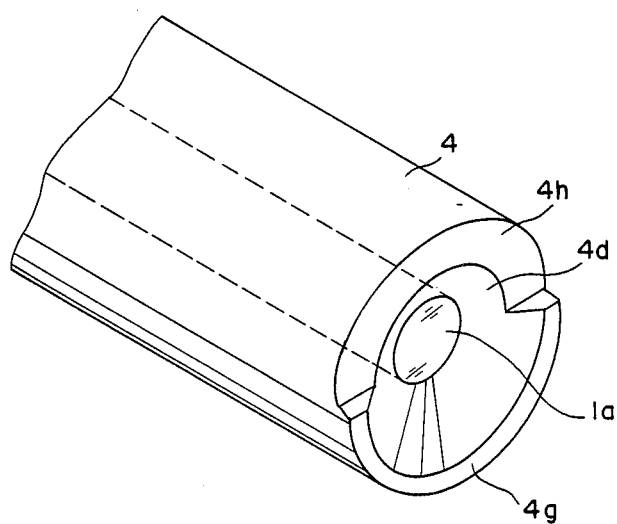
FIG. 11 is an enlarged perspective view showing a pointed end portion of a ferrule according to a fourth preferred embodiment of the present invention.
Figure 12:
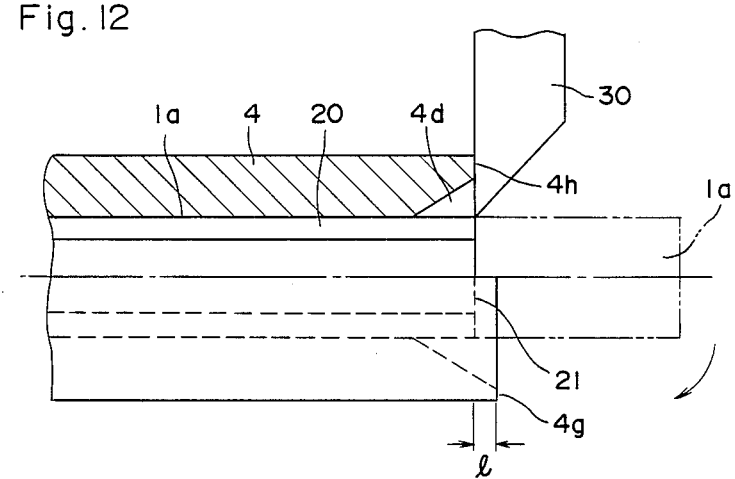
FIG. 12 is an enlarged half sectional view showing a pointed end portion of a ferrule according to a fourth preferred embodiment of the present invention.
Figure 13:
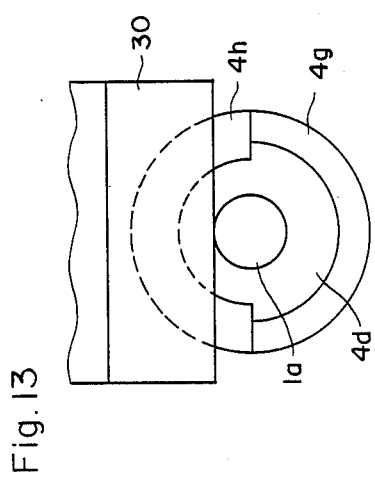
FIG. 13 is an enlarged front view showing a pointed end portion of a ferrule according to a fourth preferred embodiment of the present invention.

FIGS. 11, 12, 13 show a pointed end portion of a ferrule according to a fourth preferred embodiment of the present invention in which the ferrule 4 is provided with a concaved part 4d (about 0.3 mm deep) having a larger diameter at the pointed end face side thereof formed on the pointed end surface thereof. The concaved part 4d is formed in a bowl-like shape so that a pointed end surface 4g of ferrule remains within a range of 180° in the circumferential direction on the circumferential edge thereof. Besides, the cut-off portion is formed in the direction vertical to an axial line of the ferrule 4 within another range of 180° in the circumferential direction on the circumferential edge of the concaved part 4d so that the end face retreats by a length of l (about 0.1 mm). In short, an end face 4h backwards by 180° and an end face 4g forwards by 180° are formed.

And, in the terminal treatment of the optical fiber 1a in a connector for optical fiber according to the fourth preferred embodiment, at first the optical fiber 1a is inserted into the ferrule 4 in the same manner as in the preceding embodiment and a cylindrical member 18 is put on the ferrule 4 to fix the optical fiber 1a in the ferrule 4. Then, the pointed end is slightly projected projected out of the concaved part 4d, as shown with a twodot chain line in FIG. 12. Subsequently, as shown in, for example, FIGS. 12, 13, an edged tool 30 having an acute portion at a pointed end thereof is brought into contact with the circumferential edge of the end face 4h of the surface (the clad layer 20) of the optical fiber 1a to slightly injure said circumferential edge (in the case of a polymer clad, even a core is injured). And, the pointed end of the optical fiber 1a is held between fingers or tweezers and bent toward a side opposite to the injured portion, as shown with an arrow in FIG. 12. Thus, the optical fiber 1a is cloven with the injury as a starting end to form a cloven surface 21 on a pointed end face of the remained optical fiber 1a.

Although the cut-off portion 4h of the circumferential edge of the concaved part 4d formed on the pointed end face of the ferrule 4 is formed within a range of 180° in the circumferential direction, any angle smaller than 360° is satisfactory.

Figure 14C:
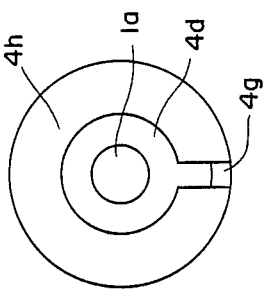
FIGS. 14(a)-14(c) are enlarged front views showing a pointed end portion of a ferrule according to a fifth preferred embodiment of the present invention.
Figure 14B:
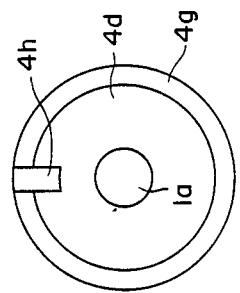
Figure 14A:
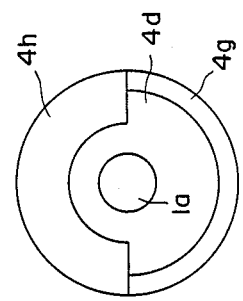

FIG. 14 is a schematic diagram showing a pointed end portion of a ferrule according to a fifth preferred embodiment of the present invention in which the cut-off portion range is variously changed in angle. (a) shows the case where the above described cut-off portion range is 180°, (b) showing the case where the above described cut-off portion range is nearly 0°, and (c) showing the case where the above described cut-off portion range is nearly 360°.

Since the pointed end of the optical fiber 1a is difficult to be brought into contact with other members if the cut-off angle is reduced and a length in a circumferential direction of the non-cut-off face 4g is increased, the smaller cut-off angle is better in view of the protection of the pointed end of the optical fiber 1a, but since the pointed end of the optical fiber 1a needs not be protected in the case where a plug 10 inserted into a receptacle 14 is hardly demounted after the terminal treatment of the optical fiber 1a, the cut-off angle of about 180° or more is preferable in view of the availability and workability of the edged tool 30.

In addition, although the concaved part 4d is arranged concentrically with an axial line of the ferrule 4 in this embodiment, it is not always necessary, that is to say the center of the concaved part 4d can be shifted toward the side of the non-cut-off face 4g.

Besides, although the cut-off face 4h is a plane vertical to an axial line of the ferrule 4 in this embodiment, the cut-off face 4h is not always vertical. Furthermore, it is necessary for the easy discrimination of the cut-off side resulting in the superior workability in the terminal treatment of the optical fiber only to mark a spot on the circumferential surface of the side of the cut-off face 4h or partially strip off plated nickel to expose a ground metal such as brass (or phosphor-bronze) or color the cut-off face 4h or the non-cut-off face 4g to discriminate in color. The exposure of brass (or phosphor-bronze) can be practiced also by cutting off the end face 4h.

Figure 15:
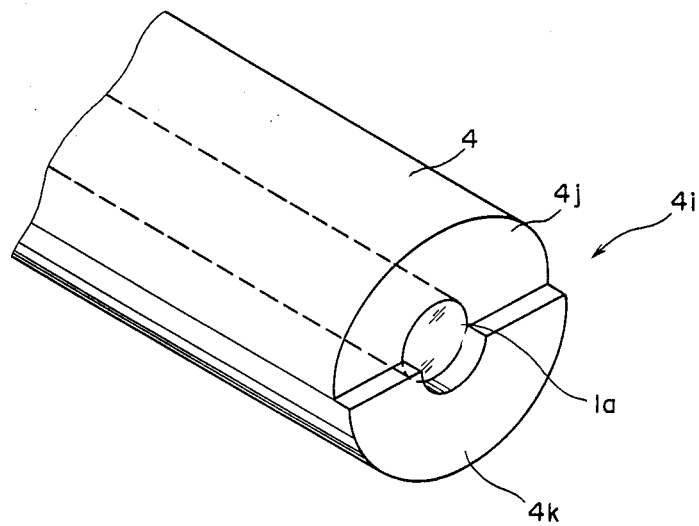
FIG. 15 is an enlarged perspective view showing a pointed end portion of a ferrule according to a sixth preferred embodiment of the present invention.
Figure 16:
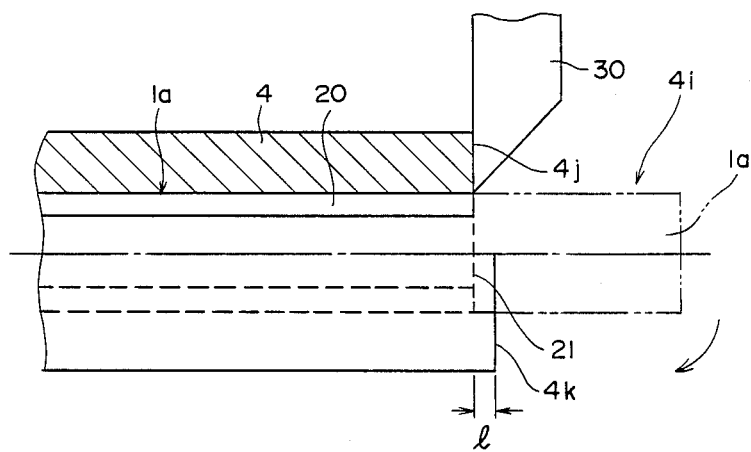
FIG. 16 is an enlarged half sectional view showing a pointed end portion of a ferrule according to a sixth preferred embodiment of the present invention.
Figure 17:
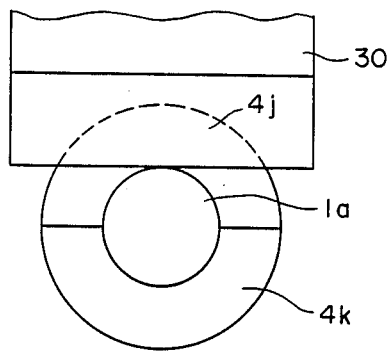
FIG. 17 is an enlarged front view showing a pointed end portion of a ferrule according to a sixth preferred embodiment of the present invention.

FIGS. 15, 16, 17 show a pointed end portion of a ferrule according to a sixth preferred embodiment of the present invention. A pointed end face 4i of the ferrule 4 is provided with a cut-off portion formed in the direction vertical to an axial line of the ferrule 4 so that the end face may retreat by a length of (about 0.1 mm) in a semicircular portion, in short a range of 180°. In short, a rear end face 4j and a front end face 4k each having a range of 180° are formed.

Figure 18:
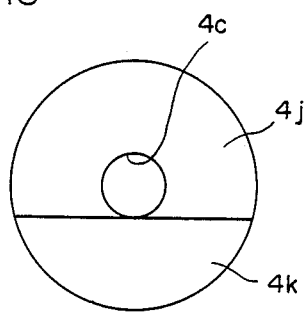
FIG. 18 is an enlarged front view showing a pointed end portion of a ferrule according to a seventh preferred embodiment of the present invention.

And, in the terminal treatment of the optical fiber 1a according to this sixth embodiment, at first, similarly to the above described embodiments, the optical fiber 1a is inserted into the ferrule 4 and fixed by means of the cylindrical member 18. Then, the pointed end of the optical fiber 1a is slightly projected out of the pointed end face 4i, as shown with a two-dot chain line in FIG. 16. Subsequently, as shown in FIGS. 16, 17, the edged tool 30 provided with an acute portion at a pointed end thereof is brought into contact with the surface (the clad layer 20) of the optical fiber 1a at the position corresponding to the rear end face 4j thereof to slightly injure the surface of the optical fiber 1a (in the case of a polymer clad, even a core is injured). And, the pointed end of the optical fiber 1a is held between fingers or tweezers and bent toward a side opposite to the injured portion, as shown with an arrow in FIG. 16. Thus, the optical fiber 1a is cloven with the injury as a starting end to form the cloven surface 21 on the pointed end face of the remained optical fiber 1a. In this time, it is recommended that the optical fiber 1a is bent in a manner of being slightly pulled forwards. Besides, a position to be injured is not limited to the above described one. It can be shifted toward a side of the front end face 4k. FIGS. 18, 19 show a seventh and eighth preferred embodiments of the present invention, respectively.

According to the preferred embodiment as shown in FIG. 18, the rear end face 4j formed by cutting off is enlarged as far as a position including an entire opened portion of an optical fiber-inserting bore 4c. In such an embodiment, since the edged tool 30 is movable in the same direction when the optical fiber 1a is to be injured by the edged tool 30, the operations become easy. In addition, the positions of the end faces 4j, 4k are not limited to the ones as shown in FIGS. 15 to 18. That is to say, those positions either above or below the ones as shown in FIGS. 15 to 18 are satisfactory.

Figure 19A:
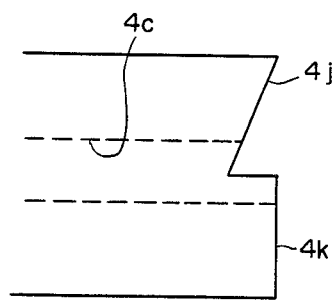
FIGS. 19(a) and 19(b) are enlarged schematic diagrams showing a pointed end portion of a ferrule according to an eighth preferred embodiment of the present invention.
Figure 19B:
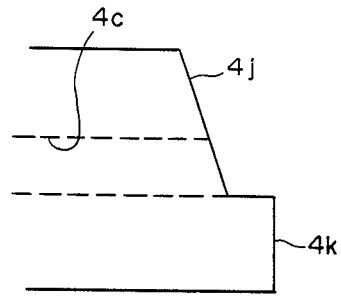

According to the preferred embodiment as shown in FIG. 19(a), the rear end face 4j is cut off so that it inclines to the inner side of the ferrule 4 and the boundary between the end faces 4j, 4k is a diameter of the front end face 4i of the ferrule similarly to those as shown in FIGS. 15 to 17. According to this embodiment, since the end face of the optical fiber is protected by both the front end edge of the end face 4k and that of the end face 4j projecting forwards after the cleavage, the structure as shown in FIG. 19(a) is suitable for a connector which is frequently used. According to the preferred embodiment as shown in FIG. 19(b), the inclination of the end face 4j is reverse to that as shown in FIG. 19(a) and the boundary between the end faces 4j, 4k is similar to that as shown in FIG. 18. According to this embodiment, the position of an edge point of the edged tool 30 is easy to watch and the edged tool 30 is superior in workability.

In addition, it is necessary for the easy discrimination of the cut-off side and the superior workability in the terminal treatment of the optical fiber only to mark a spot on the circumferential surface of the end face 4j side or to partially strip plated nickel from said circumferential surface to expose a ground metal such as brass (or phosphorbronze) or to color the end face 4j or the end face 4k. The exposure of brass (or phosphor-bronze) can be practiced also by cutting off the end face 4j.

Besides, since a ferrule according to the sixth, seventh and eighth embodiments is not provided with a concaved part and its pointed end portion is only partially cut-off, it is easy to produce.

Also, although the fixation of the optical fiber in the ferrule in the terminal treatment of the optical fiber is practiced by a method in which a cylindrical member is put under pressure onto the ferrule to reduce the base end portion of the ferrule in diameter, the fixation of the optical fiber is not limited to this method. It goes without saying that the optical fiber is inserted into the ferrule and then the base end portion of the ferrule is pressed by means of a press cutting plier and the like to bend the base end portion of the ferrule, whereby fixing the optical fiber in the ferrule.

In the terminal treatment of the optical fiber in the case where the ferrule according to the present invention is used, differently from a method in which the end face of the optical fiber is cut and then the optical fiber is returned to the inside of the ferrule to fix the optical fiber, the cylindrical member is put on the ferrule under the condition that the ferrule is slightly projected out of the cylindrical member at the pointed end thereof to fix the optical fiber and then the optical fiber is injured by means of an edged tool to cut the end portion, so that the operations are remarkably easy. In the case where the end portion of the optical fiber is previously cut, the skillful art is required for deciding the position of the fixation of the optical fiber after the cutting. On the contrary, in the case where the ferrule according to the present invention is used, the uniform terminal treatment and finishing can be achieved and the operations can be easily done by anybody.

As this invention may be embodied in several forms without departing from the spirit of essential characteristics thereof, illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A connector for optical fiber provided with an integrally cylindric ferrule into which an optical fiber is inserted, wherein said ferrule is provided with a concaved part at a pointed end face of said ferrule, and concaved part being located proximate an end of said optical fiber and including a circumferential edge, a circumferential part of said circumferential edge of said concaved part being cut off so that the length of said ferrule in a direction of an axial line of the ferrule is shorter at said circumferential part than at the rest of the circumferential edge of said concaved part.

2. A connector for optical fiber as set forth in claim 1, in which an end face of said cut-off part is perpendicular to the axial line of the ferrule.

3. A connector for optical fiber as set forth in claim 1, in which an end face of said cut-off part is not perpendicular to the axial line of the ferrule.

4. A connector for optical fiber as set forth in claim 1, in which a circumferential surface of the pointed end of the ferrule is marked so as to find an end face of said cut-off portion.

5. A connector for optical fiber as set forth in claim 4, in which said mark is an injury.

6. A connector for optical fiber as set forth in claim 4, in which said mark is a colored spot.

7. A connector for optical fiber as set forth in claim 1, in which an end face of the cut-off part and an end face of the rest are colored in tones different from each other.

8. A connector for optical fiber as set forth in claim 1, in which said ferrule is provided with slittings formed in a base end portion thereof.

9. A connector for optical fiber provided with a ferrule into which an optical fiber is inserted, comprising a pointed end portion of said ferrule which extends to a circumferential edge of the ferrule part of which is cut-off so that the length of said ferrule in a direction of an axial line of the ferrule is shorter at said part than at the rest of the pointed end portion of said ferrule wherein said end face of at least said rest of said pointed end portion and an end face of said cut-off portion are perpendicular to the axial line of the ferrule.

10. A connector for optical fiber provided with a ferrule into which an optical fiber is inserted, comprising a pointed end portion of said ferrule which extends to a circumferential edge of the ferule part of which is cut-off so that the length of said ferrule in a direction of an axial line of the ferrule is shorter at said part than at the rest of the pointed end portion of said ferrule wherein said end face of at least said rest of said pointed end portion is perpendicular to said axial line and said circumferential surface of the pointed end portion of the ferrule is marked so as to distinguish an end face of said cut-off part.

11. A connector for optical fiber as set forth in claim 10, in which said mark is an injury.

12. A connector for optical fiber as set forth in claim 10, in which said mark is a colored spot.

13. A connector for optical fiber provided with a ferrule into which an optical fiber is inserted, comprising a pointed end portion of said ferrule which extends to a circumferential edge of the ferrule part of which is cut-off so that the length of said ferrule in a direction of an axial line of the ferrule is shorter at said part than at the rest of the pointed end portion of said ferrule wherein said end face of at least said rest of said pointed end portion is perpendicular to said axial line and wherein said end face of the cut-off portion and the end face of the rest are colored tones different from each other.

14. A connector for optical fiber provided with a ferrule into which an optical fiber is inserted, comprising a pointed end portion of said ferrule which extends to a circumferential edge of the ferrule part of which is cut-off so that the length of said ferrule in a direction of an axial line of the ferrule is shorter at said part than at the rest of the pointed end portion of said ferrule wherein said end face of at least said rest of said pointed end portion is perpendicular to said axial line and said ferrule is provided with slittings formed in a base end portion thereof.

* * * * *

UNITED STATES PATENT AND TRADEMARK OFFICE
CERTIFICATE OF CORRECTION

PATENT NO. : 4,850,664

DATED : July 25, 1989

INVENTOR(S) : Eiji Iri et al

It is certified that error appears in the above-identified patent and that said Letters Patent is hereby corrected as shown below:

On the title page, item [73], should read

--Assignees: Nippon Mining Co., Ltd., Tokyo Japan and Mitsubishi Cable Industries, Ltd., Hyogo-Ken, Japan--

Signed and Sealed this

Twenty-fourth Day of July, 1990

Attest:

HARRY F. MANBECK, JR.

*Attesting Officer*  *Commissioner of Patents and Trademarks*